Nov. 7, 1961 — J. E. CURTIS — 3,007,199
EXTRUDING HEAD FILTER
Filed Jan. 20, 1959 — 2 Sheets-Sheet 1
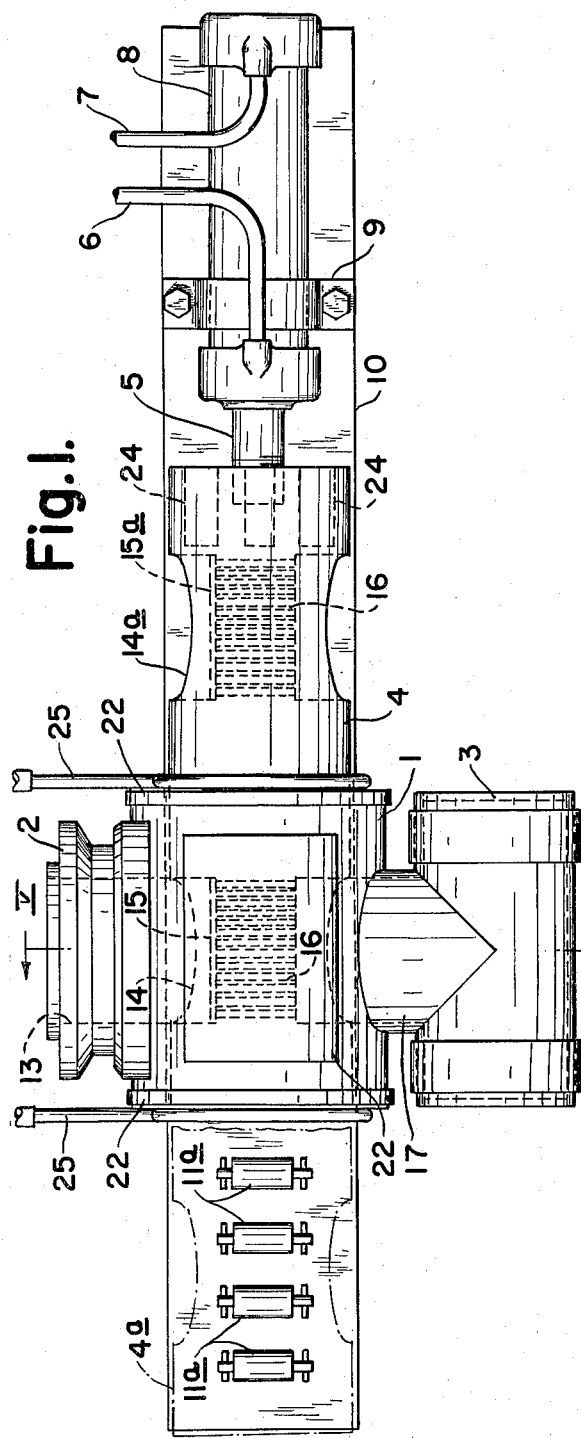
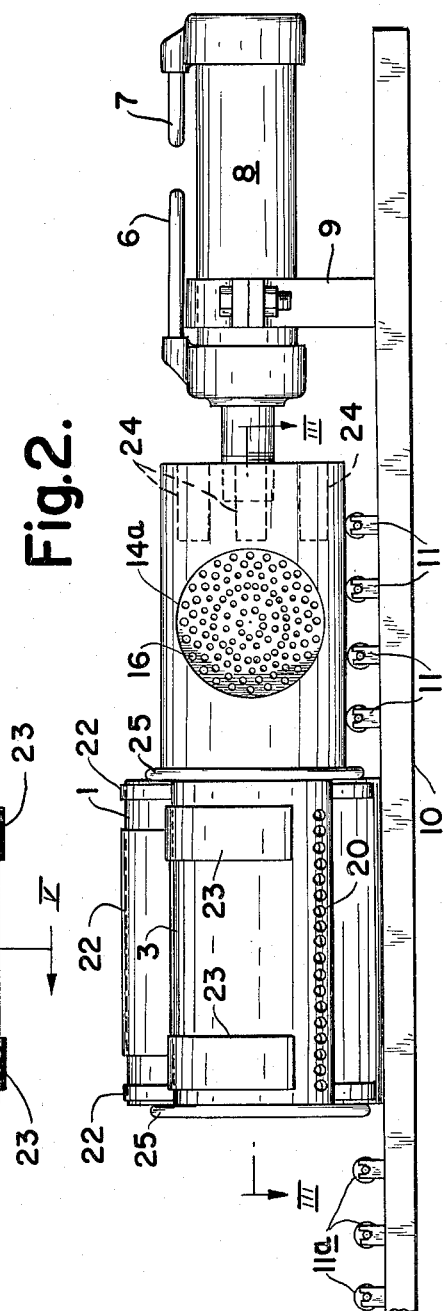
INVENTOR.
James E. Curtis
BY
ATTORNEY.

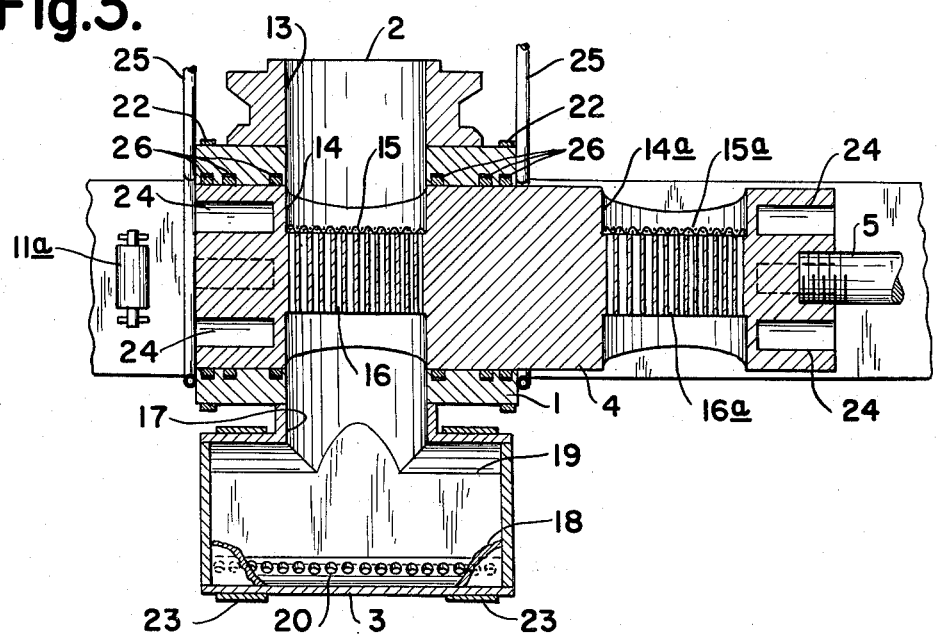
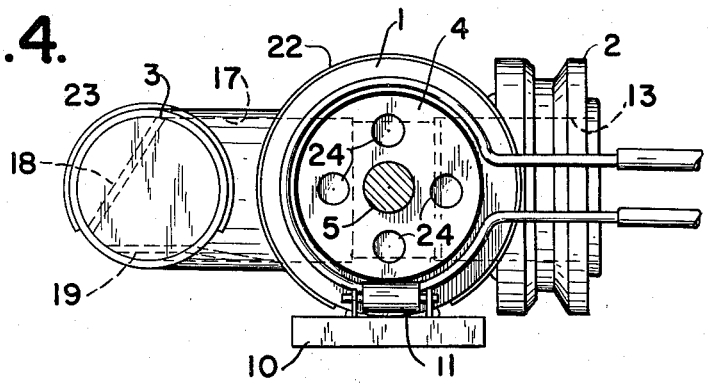
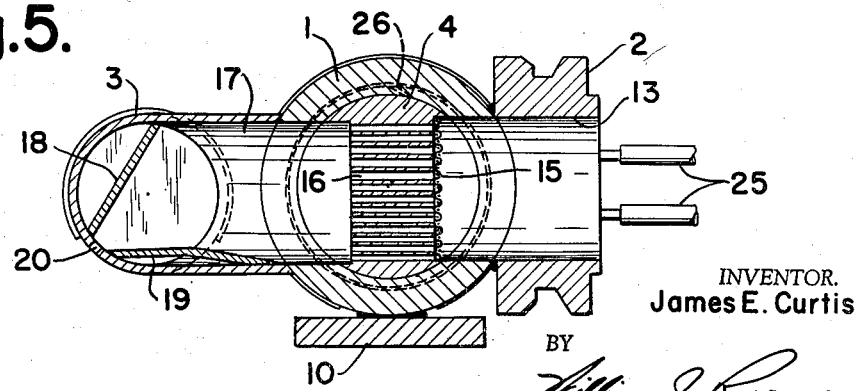

3,007,199
EXTRUDING HEAD FILTER
James E. Curtis, Washington, Pa., assignor, by direct and mesne assignments, of one-fourth to Albert Andy, Washington, Pa., one-fourth to Anthony Andy, Canonsburg, Pa., and one-half to Curtis Machine Company, Washington, Pa., a partnership
Filed Jan. 20, 1959, Ser. No. 787,988
2 Claims. (Cl. 18—12)

This invention relates to an extruding head filter for cleaning plastic material as it is extruded and, more specifically, relates to a multiple filter for a plastic extruding head which enables the removal and replacement of a filter without interrupting the extrusion process.

In plastic extrusion heads, wherein it is desired to remelt scrap plastic pieces and extrude them into different form, there is generally dirt on the pieces, therefore in a relatively short period of time, even though a filter is used in a plastic extrusion head, there will be the necessity of removing and cleaning the filter since it clogs up rather rapidly. In so doing, it is necessary to remove the pressure on the plastic material by shutting down the machine and temporarily stopping production. This operation takes an appreciable period of time and not only retards production but increases the cost for extruding plastic material.

Furthermore, because of the difficulty and time involved in cleaning or replacing the filter, there is a great tendency to allow the filter to remain clogged for abnormally long periods of time which results in a dirtier plastic product and abnormally high operating pressures to force the plastic through the clogged filter.

An object of my invention is to provide a novel filtering system for an extrusion head for plastics and similar material, which filtering system enables the removal and cleaning of the filtering screen at the same time that the extrusion process is taking place so that there will be no stoppage of the extrusion process and yet continuous filtering in the machine. This will insure a high degree of purity of the extruded plastic because of the easy and frequent changing and cleaning of the filter screen which is possible with the present invention.

A more specific object of my invention is to provide a plurality of filter screens within a plastics extrusion machine arranged in a manner so that the screens may be alternately placed into operation very quickly by hydraulic means so that one of the screens is always in operation while the other is exposed to permit cleaning.

A still further object of my invention is to provide a screening system for plastic extrusion machines, which system enables frequent and easy cleaning of the filtering screen so as to insure a very high degree of purity of the extruded plastic product as well as to greatly reduce the cost and time of production.

Other objects and advantages of my invention will become apparent from a study of the following description taken with the accompanying drawings wherein:

FIG. 1 is a top or plan view of a plastics extrusion head provided with a screening system embodying the present invention.

FIG. 2 is a front elevational view of the apparatus shown in FIG. 1.

FIG. 3 is a cross sectional view taken along lines III—III of FIG. 2.

FIG. 4 is an end, elevational view as observed from the right of FIGS. 1 and 2, and FIG. 5 is a cross sectional view taken along V—V of FIG. 1.

Referring more particularly to FIGS. 1 and 2 of the drawing, numeral 1 denotes a cylinder of a plastics extruding machine, which cylinder is provided at one end with a connection 2 for enabling connection to an extrusion barrel (not shown). On the other end of the cylinder 1 is an extruding head 3 which is connected to the cylinder 1 by means of cylindrical connector 17.

Slidably mounted in the cylinder 1 is a piston 4 which has connected to one end thereof a connecting rod 5 which is actuated hydraulically by means of a hydraulic pump (not shown) which pumps fluid through connections 6 and 7 through a hydraulic cylinder 8 on different sides of a piston therein (not shown) to enable reciprocation of the connecting rod 5 and piston 4 by operating a suitable control element (not shown).

The hydraulic cylinder 8 is secured by means of a clamp 9 to a base plate 10. On the base plate 10 there is also mounted a plurality of support rollers 11a for slidably supporting the left end of cylinder 4 as viewed in FIGS. 1 and 2.

Scrap plastic pieces are heated or melted in the extruding tube barrel (not shown) and passed through the connection 2 through a passage way 13 formed in the said connection and finally through a transverse opening 14 formed in the piston 4 as shown more clearly in FIG. 3. The plastic material is forced under high pressure through a removable screen 15 which is supported on one surface of an integral perforated portion 16 of the cylinder comprising a plurality of passageways through which the plastic may flow into the extrusion head. Further along the piston 2 there is provided a second transverse opening 14a, corresponding to opening 14, and a second removable filter 15a, which rests upon the outer surface of a second perforated portion 16a of the cylinder 4. As will be described hereinafter, the second filter is used alternately with the first so that while one of the filters is in operation, the other will be exposed to allow the operator easy access to the screen so as to remove, clean and replace it while the other screen is still in operation. Thus the extrusion process is not interrupted while the screens are being shifted (which takes a fraction of a second) or removed and cleaned.

Within the extrusion head 3 there are provided deflector plates 18 and 19 in order to deflect the plastic material in a direction toward a series of aligned openings 20 forming the extrusion dies or outlet openings through which the plastic is extruded in the form of a plurality of thin strands somewhat like spaghetti. As will be apparent from FIGURE 3, the total cross-sectional area of holes 20 is substantially smaller than the cross-sectional area extending through the longitudinal axis of the head, thereby permitting the head to act as a reservoir or storage chamber to prevent breakage of the strands during shifting of the filters.

In order to enable quick heating of the plastic material there are provided heating bands 22 which encircle the cylinder 1 and heating bands 23 which encircle the extrusion head. There are also provisions for additional heating elements in recesses 24 shown at both ends of the piston. The heating elements themselves are not shown.

When it is desired to cool the cylinder and extrusion head water is circulated through chilling tube 25.

In order to insure against escape of plastic material, particularly in view of the high pressure under which it is placed during the extrusion process, scraping rings or piston rings 26 are provided. Piston 4 can thus be reciprocated without loss of the plastic material or loss of pressure.

In operation, when piston 4 is in the position shown in FIGS. 1, 2 and 3, the plastic material will flow through filter 15 and openings 16, thence into the head 3 and through the outlet openings 20 in final form. Thus, while filter 15 is screening the dirt, it is possible to change and clean the exposed filter 15a.

When filter 15 becomes clogged with dirt, the operator, by means of a suitable control valve, will introduce fluid pressure in pipe 7 so as to move the piston 4 to the left whereupon the left portion of the piston will ride on rollers 11a. Now the clean screen 15a and perforated portion 16a will move into alignment with passageway 13 so as to assume the filtering function. In the meanwhile, the clogged filter 15 will be exposed at the left of cylinder 1 so that it may be removed, cleaned and then replaced without removing the pressure on the plastic material or otherwise interrupting the extrusion process.

Of course, when screen 15a becomes clogged, pressure will be introduced through pipe 6 so as to push rod 5 and cylinder 4 to the position shown in the drawings.

The round form of the piston, particularly with the rings, assures an air-tight seal.

Thus it will be seen that I have provided an efficient filtering system for cleaning plastic material as it is introduced into the extruding head, which enables easy and quick removal, cleaning and replacing of clogged filters without interrupting the extrusion process, that is, without stoppage of production, thereby enabling more frequent cleaning of the filters so as to obtain a highly pure product at considerably less time and cost of production.

While I have illustrated and described a single specific embodiment of my invention, it will be understood that this is by way of illustration only, and that various changes and modifications may be made within the contemplation of my invention and within the scope of the following claims.

I claim:

1. In an extruding machine for continuously extruding material in clean, plastic form, comprising, in combination, an extruding head having outlet opening means through which said material is extruded in strip form, a hollow cylinder having an opening extending transversely in the wall thereof forming an inlet for plastic material, and a second transverse opening in said wall diametrically opposite the first mentioned opening and which is in communication with said extruding head, a solid cylindrical piston reciprocably slidable in said hollow cylinder, said piston having a group of closely spaced, parallel holes extending transversely therethrough and having a second group of closely spaced, parallel holes extending parallel to but axially spaced from the first group of holes, said piston having a well-shaped portion at one end of each of said groups of holes, a screen supported in each of said well-shaped portions and having openings smaller than said holes for straining impurities from the plastic material entering said inlet, the other end of said holes being in registry with said second transverse opening, said axial spacing of said groups of holes being such that when one group is in alignment with said transverse openings, the other will be outside of said hollow cylinder and extrusion machine, exposed to view of the operator to enable replacement of the screen, power operated means for selectively and quickly sliding said piston in said cylinder in either direction in the order of one second so as to selectively expose either of said screens without interrupting the continuity of the extruded strip material as a consequence of said sliding movement of the piston, and sealing means between said cylinder and piston to maintain the pressure of the plastic material during said sliding movement.

2. Apparatus as recited in claim 1 wherein said sealing means comprises a plurality of piston rings mounted on the inner wall surface of said hollow cylinder and slidably engaging the outer wall surface of said piston.

References Cited in the file of this patent

UNITED STATES PATENTS

| | | |
|---|---|---|
| 642,813 | Cowen | Feb. 6, 1900 |
| 2,661,497 | Birmingham | Dec. 8, 1953 |
| 2,763,374 | Corbett | Sept. 18, 1956 |
| 2,838,084 | Samler | June 10, 1958 |